US007172982B2

(12) United States Patent
Jaglowski et al.

(10) Patent No.: US 7,172,982 B2
(45) Date of Patent: Feb. 6, 2007

(54) DRYER AND/OR INDUSTRIAL FABRIC WITH SILICONE-COATED SURFACE

(75) Inventors: Adam J. Jaglowski, Swansea, MA (US); Alan L. Billings, Clifton Park, NY (US)

(73) Assignee: Albany International Corp., Albany, NY (US)

( * ) Notice: Subject to any disclaimer, the term of this patent is extended or adjusted under 35 U.S.C. 154(b) by 500 days.

(21) Appl. No.: 10/331,279

(22) Filed: Dec. 30, 2002

(65) Prior Publication Data

US 2004/0126544 A1 Jul. 1, 2004

(51) Int. Cl.
*B32B 5/18* (2006.01)

(52) U.S. Cl. ............................ 442/76; 34/111; 34/116; 34/123; 139/383 A; 162/206; 162/306; 162/358.2; 162/900; 442/148; 442/157; 442/271; 442/275; 442/281; 428/192; 428/194; 428/221

(58) Field of Classification Search ................ 428/192, 428/194, 195.1, 98, 221; 442/76, 148, 157, 442/271, 275, 281; 162/206, 306, 358.2, 162/904, 358.4, 900, 901, 902; 34/123, 111, 34/116; 139/383 A, 383 AA, 425
See application file for complete search history.

(56) References Cited

U.S. PATENT DOCUMENTS 4,731,281 A * 3/1988 Fleischer et al. ........... 428/196
5,360,656 A 11/1994 Rexfelt et al.
5,397,438 A 3/1995 Nyberg et al.
5,731,059 A 3/1998 Smith et al.
5,787,602 A * 8/1998 Hsu et al. ..................... 34/116
5,829,488 A 11/1998 Fagerholm et al.
6,186,209 B1 2/2001 Lanthier
6,276,420 B1 8/2001 Lanthier
6,358,594 B1 * 3/2002 Ampulski ................... 428/102
2003/0054141 A1 * 3/2003 Worley et al. .............. 428/195
2004/0033743 A1 * 2/2004 Worley et al. ................ 442/59
2004/0089364 A1 * 5/2004 Josef et al. ............. 139/383 A

FOREIGN PATENT DOCUMENTS

DE 197 46 848 A1 4/1999
WO WO 97/14846 4/1997

* cited by examiner

*Primary Examiner*—Arti R. Singh
(74) *Attorney, Agent, or Firm*—Frommer Lawrence & Haug LLP; Ronald R. Santucci

(57) ABSTRACT

An industrial fabric having improved sheet restraint and wear resistance along with acceptable permeability. The improvement is effected by coating only the high spots of the fabric with silicone material. The coating methods used in this invention may include kiss roll coating, gravure roll coating, rotogravure printing, rotary screen coating, screen-printing and/or flexography. The improvement is also applicable to corrugator fabrics.

16 Claims, 3 Drawing Sheets

DRYER AND/OR INDUSTRIAL FABRIC WITH SILICONE-COATED SURFACE

BACKGROUND OF THE INVENTION

1. Field of the Invention

The present invention relates to the papermaking arts. More specifically, the present invention relates to a dryer fabric, although it may find application in any of the fabrics used in the forming, pressing and drying sections of a paper machine, and in industrial process fabrics and corrugated fabrics generally.

Industrial process fabrics referred to herein may include those used in the production of, among other things, wetlaid products such as paper and paper board, and sanitary tissue and towel products; in the production of tissue and towel products made by through-air drying processes; corrugator belts used to manufacture corrugated paper board; and engineered fabrics used in the production of wetlaid and drylaid pulp; in processes related to papermaking such as those using sludge filters, and chemiwashers; and in the production of non-wovens produced by hydroentangling (wet process), meltblowing, spunbonding, and airlaid needle punching. Such industrial process fabrics include, but are not limited to non-woven felts; embossing, conveying, and support fabrics used in processes for producing non-wovens; and filtration fabrics and filtration cloths.

Corrugator fabrics referred to herein are the so-called corrugator belts which run on the corrugator machines used to manufacture corrugated paper board, as explained in greater detail below.

2. Description of the Prior Art

During the papermaking process, a cellulosic fibrous web is formed by depositing a fibrous slurry, that is, an aqueous dispersion of cellulose fibers, onto a moving forming fabric in the forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

Contemporary fabrics are produced in a wide variety of styles designed to meet the requirements of the paper machines on which they are installed for the paper grades being manufactured. Generally, they comprise a woven or other type base fabric. Additionally, as in the case of fabrics used in the press section, the press fabrics have one or more base fabrics into which has been needled a batt of fine, nonwoven fibrous material. The base fabrics may be woven from monofilament, plied monofilament, multifilament or plied multifilament yarns, and may be single-layered, multi-layered or laminated. The yarns are typically extruded from any one of the synthetic polymeric resins, such as polyamide and polyester resins, used for this purpose by those of ordinary skill in the paper machine clothing arts.

The woven base fabrics themselves take many different forms. For example, they may be woven endless, or flat woven and subsequently rendered into endless form with a woven seam. Alternatively, they may be produced by a process commonly known as modified endless weaving, wherein the widthwise edges of the base fabric are provided with seaming loops using the machine-direction (MD) yarns thereof. In this process, the MD yarns weave continuously back-and-forth between the widthwise edges of the fabric, at each edge turning back and forming a seaming loop. A base fabric produced in this fashion is placed into endless form during installation on a paper machine, and for this reason is referred to as an on-machine-seamable fabric. To place such a fabric into endless form, the two widthwise edges are brought together, the seaming loops at the two edges are interdigitated with one another, and a seaming pin or pintle is directed through the passage formed by the interdigitated seaming loops.

Further, the woven base fabrics may be laminated by placing at least one base fabric within the endless loop formed by another, and by needling a staple fiber batt through these base fabrics to join them to one another as in the case of press fabrics. One or more of these woven base fabrics may be of the on-machine-seamable type. This is now a well known laminated press fabric with a multiple base support structure.

In any event, the fabrics are in the form of endless loops, or are seamable into such forms, having a specific length, measured longitudinally therearound, and a specific width, measured transversely thereacross.

Reference is now made more specifically to industrial fabrics used in the manufacture of corrugated paper board, or box board, on corrugator machines. Such an industrial fabric is used to form corrugator belts. On corrugator machines, corrugator belts support and pull a sheet of liner board and a sheet of paper board which pass over a roll which adds flutes or CD corrugations to the paperboard sheet. Then these at least two paperboard sheets supported by one or more belts are passed first through a heating zone, where an adhesive used to bond the at least two layers of the board together is dried and cured, and then through a cooling zone. Frictional forces between the corrugator belt, specifically the face, or board, side thereof, and the corrugated paper board are primarily responsible for pulling the latter through the machine.

Corrugator belts should be strong and durable, and should have good dimensional stability under the conditions of tension and high temperature encountered on the machine. The belts must also be comparatively flexible in the longitudinal, or machine, direction, while having sufficient rigidity in the cross-machine direction to enable them to be guided around their endless paths. Traditionally, it has also been desirable for the belts to have porosities sufficient to permit vapor to pass freely therethrough, while being sufficiently incompatible with moisture to avoid the adsorption of condensed vapor which might rewet the surfaces of the corrugated paper product.

As implied in the preceding paragraph, a corrugator belt takes the form of an endless loop when installed on a corrugator machine. In such form, the corrugator belt has a face, or boardside, which is the outside of the endless loop, and a backside, which is the inside of the endless loop. Frictional forces between the backside and the drive rolls of the corrugator machine move the corrugator belt, while frictional forces between the faceside and the sheet of corrugated board pull the sheet through the machine.

Corrugator belts are generally flat-woven, multi-layered fabrics, each of which is woven to size or trimmed in the lengthwise and widthwise directions to a length and width appropriate for the corrugator machine on which it is to be installed. The ends of the fabrics are provided with seaming means, so that they may be joined to one another with a pin, pintle, or cable when the corrugator belt is being installed on a corrugator machine.

In a typical corrugator machine, the heating zone comprises a series of hot plates across which the sheet of corrugated board is pulled by the corrugator belt. A plurality of weighted rollers within the endless loop formed by the corrugator belt press the corrugator belt toward the hot plates, so that the corrugator belt may pull the sheet across the hot plates under a selected amount of pressure. The weighted rollers ensure that the sheet will be firmly pressed against the hot plates, and that frictional forces between the corrugator belt and the sheet will be sufficiently large to enable the belt to pull the sheet.

In a new generation of corrugator machines, the weighted rollers have been replaced with air bearings, which direct a high-velocity flow of air against the back side of the corrugator belt and toward the hot plates to force the corrugator belt toward the hot plates. In order to prevent the high-velocity air flow from passing through the corrugator belt, which would cause the belt to lift from the sheet of corrugated board and allow the sheet to slip in the running direction relative to the belt, leading to poor contact between the sheet and the hot plates and ultimately to poor, non-uniform bonding in the laminated corrugated board product, the backsides of the corrugator belts used on machines having air bearings have a layer of polymeric resin material, which is impermeable and seals the corrugator belt to prevent air from passing therethrough. A more detailed description of the foregoing is found in, for example, U.S. Pat. No. 6,186,209.

In an even newer generation of corrugator machines, the corrugator belt which presses the web of corrugated board against the hot plates has been eliminated to avoid such belt-related problems as seam mark, edge crush, edge wear and board warping. Instead, a pair of belts downstream from the heating zone in a cooling zone sandwich the sheet of corrugated board from above and below and pull it through the cooling zone.

It has been found that the corrugator belts currently available have not worked satisfactorily when installed on this latest generation of corrugator machines. At present, corrugator belts have a needled or woven surface with a coefficient of friction, relative to corrugated board, in a range from 0.15 to 0.20. As the corrugator belts contact the web of corrugated board only in the cooling zone over a total area much less than that characterizing older machines, current belts have not been able to generate frictional forces large enough to pull the web through the corrugator machine.

Clearly, corrugator machines of this most recent type require corrugator belts whose surfaces have a greater coefficient of friction, relative to corrugated board, than those currently available, so that they will be able to generate the required frictional forces. Such a corrugator belt is described in, for example, U.S. Pat. No. 6,276,420.

Referring, now, more specifically to fabrics used in the dryer section of paper machines, dryer cylinders are typically arranged in top and bottom rows or tiers. Those in the bottom tier are staggered relative to those in the top tier, rather than being in a strict vertical relationship. As the paper sheet being dried proceeds through the dryer section, it alternates between the top and bottom tiers by passing first around a dryer cylinder in one of the two tiers, then around a dryer cylinder in the other tier, and so on sequentially through the dryer section.

In many dryer sections, the top and bottom tiers of dryer cylinders are each clothed with a separate dryer fabric. In dryer sections of this type, the paper sheet being dried passes unsupported across the space, or “pocket”, between the dryer cylinders of one tier and the dryer cylinders of the other tier.

As machine speeds are increased, the paper sheet being dried tends to flutter when passing across the pocket and often breaks. The resulting need to shut down the entire paper machine, and then to rethread the paper sheet through the dryer section, has an adverse impact on production rates and efficiency.

In order to increase production rates while minimizing disturbance to the paper sheet, single-run dryer sections are used to transport the paper sheet being dried at higher speeds than could be achieved in traditional dryer sections. In a single-run dryer section, a single dryer fabric follows a serpentine path sequentially about the dryer cylinders in the top and bottom tiers. As such, the paper sheet is guided, if not actually supported, across the pocket between the top and bottom tiers.

It will be appreciated that, in a single-run dryer section, the dryer fabric holds the paper sheet being dried directly against the dryer cylinders in one of the two tiers, but carries it around the dryer cylinders in the other tier. Alternatively, a single-run dryer section may have only one tier of dryer cylinders. Such a section has a turning roll, which may be smooth, grooved, or be provided with suction means, in the pocket between each pair of cylinders. This kind of dryer section is known as a single-tier dryer section.

Air carried along by the backside surface of the moving dryer fabric forms a compression wedge in the narrowing space where the moving dryer fabric approaches a dryer cylinder or turning roll. The resulting increase in air pressure in the compression wedge causes air to flow outwardly through the dryer fabric. This air flow, in turn, can force the paper sheet away from the paper contacting surface of the dryer fabric, a phenomenon known as “drop off”, when the paper sheet is not between the dryer fabric and the dryer cylinder. “Drop off” can reduce the quality of the paper product being manufactured by causing edge cracks, and can also reduce machine efficiency if it leads to sheet breaks.

Many paper mills have addressed this problem by machining grooves into the turning rolls with which the single-tier dryer fabric comes directly into contact or by adding a vacuum source to those turning rolls. Both of these expedients allow the air otherwise trapped in the compression wedge to be removed without passing through the dryer fabric.

In this connection, fabric manufacturers have also employed application of coatings to fabrics to impart additional functionality to the fabric, such as "sheet restraint methods". The importance of applying coatings as a method for adding this functionality to for example, dryer fabrics, has been cited by Luciano-Fagerholm (U.S. Pat. No. 5,829,488 (Albany), titled, "Dryer Fabric With Hydrophilic Paper Contacting Surface").

Luciano and Fagerholm have demonstrated the use of a hydrophilic surface treatment of fabrics to impart sheet-holding properties while maintaining close to the original permeability. However, this method of treating fabric surfaces, while successful in imparting sheet restraint, enhanced hydrophilicity and durability of the coating is desired. WO Patent 97/14846 also recognizes the importance of sheet restraint methods, and relates to using silicone-coating materials to completely cover and impregnate a fabric, making it substantially impermeable. However, this significant reduction in permeability is unacceptable for dryer fabric applications. Sheet restraint is also discussed in U.S. Pat. No. 5,397,438, which relates to applying adhesives on lateral areas of fabrics to prevent paper shrinkage. Other related prior art includes U.S. Pat. No. 5,731,059, which reports using silicone sealant only on the fabric edge for high temperature and anti-raveling protection; and U.S. Pat. No. 5,787,602 which relates to applying resins to fabric knuckles. All of the above referenced patents are incorporated herein by reference.

None of the above mentioned patents, however, disclose selectively applying silicone to the knuckles of industrial fabrics, particularly dryer fabrics, or to discrete, discontinuous locations on the sheet contact surface, so to increase both the sheet restraint and the wear resistance of the fabric while at the same time maintaining acceptable air permeability.

SUMMARY OF THE INVENTION

The present invention is directed towards improving the sheet restraint and sheet guiding properties, and wear and temperature resistance of industrial fabrics, while at the same time maintaining acceptable air permeability of the fabric. This improvement is effected by coating only the raised portions, knuckles, or discrete, discontinuous locations on the sheet contact surface of the fabric with silicone material. The coating methods used in this invention may include kiss roll coating, gravure roll coating, rotogravure printing, rotary screen coating, screen-printing and/or flexography, or other means suitable for the purpose.

The present invention will now be described in more complete detail with reference being made to the figures identified below.

DETAILED DESCRIPTION OF THE PREFERRED EMBODIMENTS

Preliminarily, it is noted that while the discussion of the present invention refers to dryer fabrics, it has applicability to other fabrics in the papermaking industry and other industrial applications. Additional applications include industrial corrugated fabrics. Fabric constructions include woven, spiral wound, knitted, extruded mesh, spiral-link, spiral coil and other nonwoven fabrics. These fabrics may comprise monofilament, plied monofilament, multifilament or plied multifilament yarns, and may be single-layered, multi-layered or laminated. The yarns are typically extruded from any one of the synthetic polymeric resins, such as polyamide and polyester resins, used for this purpose by those of ordinary skill in the industrial fabric arts.

Figure 1:
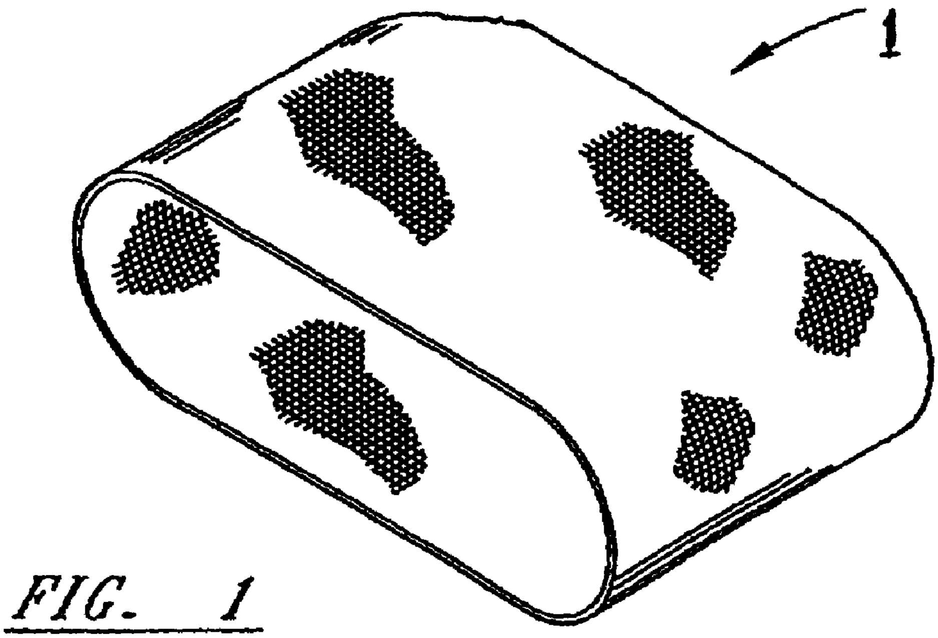
FIG. 1 is a schematic view of a papermaker's or industrial fabric according to the present invention.
Figure 2:
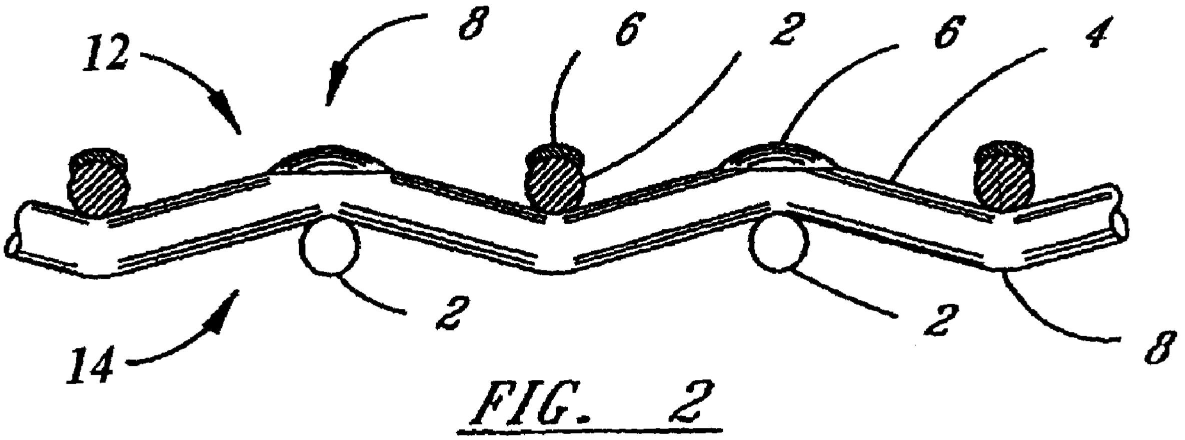
FIG. 2 is a cross-sectional view of the fabric of the present invention.
Figure 3:
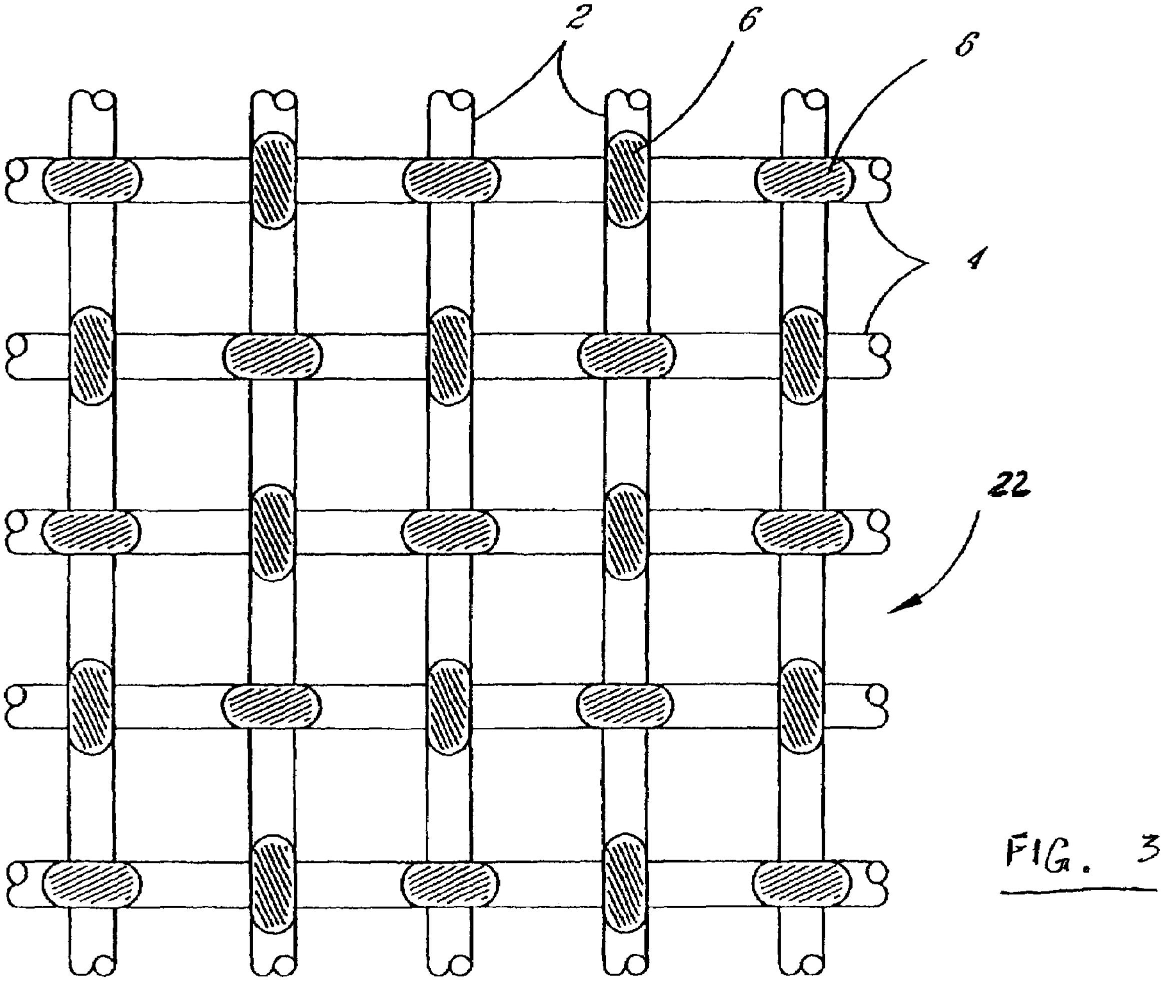
FIG. 3 is a plan view of the fabric section shown in FIG. 2.

Referring now to the drawings, an example of the invention will be described in more detail. FIG. 1 is a schematic view of a generic construction of a continuous industrial fabric, which may be, for example, a dryer fabric, identified with the numeral 1. Fabric 1 may be formed by weaving, an example of which is shown in FIGS. 2 and 3. FIG. 2 shows a side view with warp yarns 2 weaving with weft yarns 4 in any suitable weave pattern. Where the warp and weft yarns cross, raised portions, or knuckles, 8 are formed on support surface 12 and roller contact surface 14.

According to the present invention, it has been found that coating support surface 12 with a silicone resin improves the paper-holding and wear characteristics of the support surface 12. Accordingly, a coating of silicone is adhered to support surface 12, forming crowns 6 on knuckles 8 of warp and weft yarns 2 and 4. Crowns 6 are typically formed to be no wider than the diameter of warp and weft yarns 2 and 4 thereby not altering the desired air permeability of the fabric. However, the silicone coating may also be adhered so to cover greater surface areas of the yarns 2, 4 around the knuckles 8, thereby providing increased adhesion of the support surface 12 to a paper sheet, still without altering the desired air permeability of the fabric.

Figure 4:
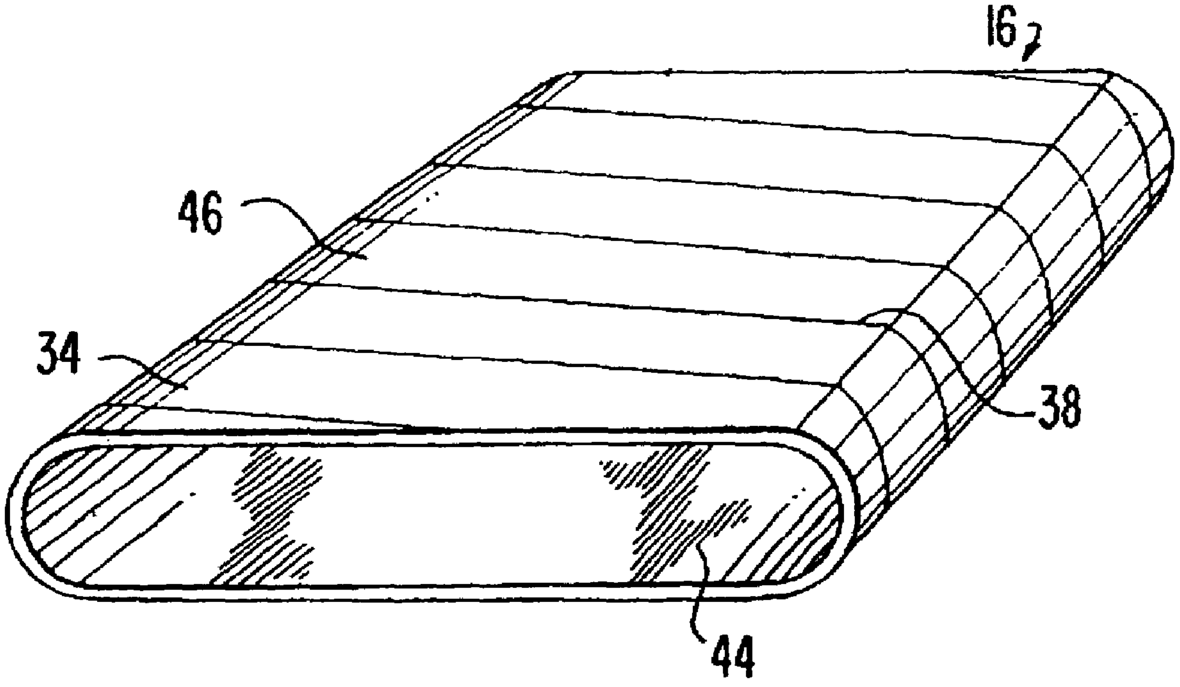
FIG. 4 is a perspective view of an alternative embodiment the present invention.

It should be noted that the fabric need not be a full width structure but can be a strip 34 of fabric such as that disclosed in U.S. Pat. No. 5,360,656 to Rexfelt, the disclosure of which is incorporated herein by reference, and subsequently formed into a full width belt 16 as shown in FIG. 4. The strip 34 can be unwound and wound up on a set of rolls after fully processing. These rolls of belting materials can be stored and can then be used to form an endless full width structure 16 using, for example, the teachings of the immediately aforementioned patent.

It should be appreciated that practical experiments carried out with a coated fabric prepared according to the above formulas gave good results and confirmed the technical effect of the invention. One such experiment involved, for example, AERO2000 dryer fabrics coated on the knuckles with silicone. While the uncoated fabric held the paper sheet satisfactorily, the silicone-coated fabrics demonstrated even further improved sheet restraint. In particular, the static and dynamic coefficients of friction of the silicone-coated fabrics with "wet" paper sheets were determined to be within the normal range of 0.4 to 0.8. Another experiment involved, for example, abrasion testing of silicone-coated BEL-PLANE® fabrics with "dry" paper sheets. The silicone-coated fabrics demonstrated improved wear resistance. In this connection, it should also be noted that silicones have excellent high temperature resistance which is suitable for fabric applications exposed to heat.

Fabrication of the silicone coating is now described. Firstly, it should be understood that the silicones used in the present invention may include, for example, peroxide-cured silicone, platinum-cured silicone, room temperature vulcanized silicone (e.g., RTV-1 or RTV-2 silicone), liquid silicone rubbers (LSR) and waterborne silicones. It should be further understood that the silicones may be filled or unfilled with additives. Incorporating additives into the silicones yields additional fabric properties which may not be provided by the silicone alone. Finally, it is to be appreciated that inclusion of the additives provide the silicone resins with a viscosity which allows selective coating of the fabric knuckles or discrete, discontinuous locations on the sheet contact surface of the fabric.

According to the present invention, the coating methods may include prior known technology, such as, kiss roll coating, gravure roll coating, rotogravure printing, rotary screen coating, screen-printing or flexography. It should be understood that when employed, these coating and printing methodologies will possess a technical component, such as an embossed surface, impression surface stenciled area or process roll configurations. This allows for selective, precisely metered and uniformly applied coatings as described above. It should be further understood that after coating, the coating on the dryer or industrial fabric will be cured, solidified and/or condensed by one of the following methods: hot oven, hot box, hot roll, hot gasses, UV light source, cooling box, cooling gases, or combinations thereof.

Modifications to the above would be obvious to those of ordinary skill in the art, but would not bring the invention so modified beyond the scope of the appended claims. For example, very small areas, that is, areas equal to only several knuckles, may be covered with silicone while still maintaining acceptable fabric permeability. Further, a varying density of silicone across the fabric in the cross direction may be applied, for example, by coating more of the knuckle or a greater percentage of knuckles or fabric surface area. In this regard, while knuckles or other raised portions have been referred to particularly in the case of woven fabrics, the present invention has applications with regard to fabrics of other construction wherein it is desirable to apply a coating to discrete, discontinuous areas. Finally, while silicone has been specifically referred to, the present invention may be utilized with other high viscosity coatings and impregnates used in industrial applications, as will be apparent to one skilled in the art.

What is claimed is:

1. An industrial fabric comprising a base substrate and a coating of silicone resin adhered only to raised surfaces or in discrete discontinuous locations so to increase the sheet guiding and sheet restraint capacity of said fabric whilst maintaining desired fabric air permeability.

2. The fabric of claim 1 wherein said raised portions are formed from a plurality of warp yarns interwoven with a plurality of weft yarns forming a plurality of knuckle surfaces over said fabric.

3. The fabric of claim 1, wherein the silicone is selected from the group comprising peroxide-cured silicones, platinum-cured silicones, room temperature vulcanized silicones, liquid silicone rubbers and waterborne silicones.

4. The fabric of claim 1, wherein at least one additive is incorporated into the silicone resin so to enhance the adherence of the coating to the fabric.

5. The fabric of claim 1 wherein the fabric is a forming, press, dryer, TAD, corrugator fabric, or engineered fabric.

6. The fabric of claim 1 wherein said base substrate is taken from the group consisting essentially of woven, spiral wound, knitted, extruded mesh, spiral-linked, spiral coil, and other non-wovens.

7. A dryer fabric for use in the dryer section of a papermaking machine, comprising:

a plurality of warp yarns interwoven with a plurality of weft yarns forming a plurality of knuckle surfaces over said dryer fabric; and a coating of silicone resin adhered only to said knuckle surfaces or at discrete discontinuous locations so to increase the sheet restraint and sheet guiding capacity of said fabric whilst maintaining desired fabric air permeability.

8. The dryer fabric of claim 7, wherein the silicone is selected from the group comprising peroxide-cured silicones, platinum-cured silicones, room temperature vulcanized silicones, liquid silicone rubbers and waterborne silicones.

9. A dryer fabric coated with a high-viscosity silicone material on the raised portions of said fabric or at discrete discontinuous locations so to increase the frictional and wear characteristics of said fabric over a fabric which is not coated with said high-viscosity material whilst maintaining desired fabric air permeability.

10. A dryer fabric of spiral-linked construction for use in the dryer section of a papermaking machine and having a coating of silicone resin adhered only at discrete discontinuous locations on a sheet contact surface of the fabric so to increase the sheet restraint and sheet guiding capacity of said fabric whilst maintaining desired fabric air permeability.

11. A corrugator belt which runs on a corrugator machine used to manufacture corrugated paper board, and having a coating of silicone resin adhered only at discrete discontinuous locations on a faceside of the belt so to increase the sheet restraint and sheet guiding capacity of said belt.

12. An industrial fabric comprising a base substrate and a coating of high viscosity resin adhered only to raised surfaces or in discrete discontinuous locations so to increase the sheet guiding and sheet restraint capacity of said fabric whilst maintaining desired fabric air permeability.

13. An industrial fabric comprising a base substrate and a coating of silicone resin adhered only to raised surfaces or in discrete discontinuous locations so to increase the sheet guiding and sheet restraint capacity of said fabric whilst maintaining desired fabric air permeability, wherein the density of the adhered silicone resin varies across the fabric in a cross-machine-direction.

14. The fabric of claim 13 wherein the silicone resin is applied to at least one edge of the fabric.

15. The fabric of claim 13 wherein the silicone resin is applied to two edges of the fabric.

16. The fabric of claim 13 wherein the density of the adhered silicone resin is greater at the fabric edges than at the middle of the fabric.

* * * * *